Jan. 12, 1965    R. D. MILLER    3,165,620
HEATED STEERING WHEEL FOR VEHICLES
Filed Feb. 23, 1962

INVENTOR.
RICHARD D. MILLER
BY *Joseph Harold Nissen*
ATTORNEY

United States Patent Office 3,165,620
Patented Jan. 12, 1965

3,165,620
HEATED STEERING WHEEL FOR VEHICLES
Richard D. Miller, 226—26 Union Turnpike,
Flushing 64, N.Y.
Filed Feb. 23, 1962, Ser. No. 174,999
5 Claims. (Cl. 219—204)

This invention relates to heated steering wheels for vehicles. More particularly, this invention is concerned with a steering wheel having a heating device operative therewith.

A vehicle steering wheel usually assumes the ambient temperature, and during cold weather discomfort to the vehicle operator usually arises when the steering wheel is first touched and such discomfort continues until the interior of the vehicle is sufficiently heated.

It is well known that the ordinary plastic steering wheel usually used in vehicles becomes quite cold during cold weather and it is difficult for the vehicle operator to place his hands onto the plastic steering wheel during cold weather, since it takes some time for the vehicle heater to warm the interior of the car or vehicle to warm the plastic steering wheel.

It is important to appreciate that the safest and best way to operate a motor vehicle is to handle the the steering wheel with bare hands and without the use of gloves.

It is therefore an object of the invention to provide a plastic steering wheel adapted to be heated to overcome the ambient temperature.

Another object of the invention is to provide a plastic steering wheel having a heating coil embedded therein.

A further object of the invention is to provide a covering for the conventional plastic stearing wheel, with the aforesaid covering having a heating element embedded therein.

In order to accomplish the aforesaid objects, the present invention proposes the provision of a plastic steering wheel having a resistance heating element embedded therein. It is further proposed that the heating element be energized from the automotive power source, i.e. the battery or the generator, with suitable connections being provided from the embedded resistance element within the interior of the steering column to the automotive power source.

The present invention also proposes the provision, as a modification, of a resistance element embedded within a material covering which is adapted to fit onto the plastic steering wheel. Provision is also made for the connection of the ends of the electrical heating element to a combination unit comprising a rotary conductive disc and a stationary conductive disc to couple the electrical heating element to the vehicle power source.

Yet another object of the present invention is the provision of an improved steering wheel of the above character which is of simple design and construction, economical to manufacture, and highly efficient in the accomplishment of its intended purpose.

A still further object of the present invention is the provision of an improved heated steering wheel of the above character which is provided with novel means for connection of the electrical heating element to the vehicle power source, and which is of simple design and construction, economical to manufacture, and highly efficient in the accomplishment of its intended purpose.

The objects, advantages and nature of the invention will be more fully understood from the following description of the preferred embodiments of the invention, shown, by way of example, in the accompanying drawings, in which.

Figure 1:
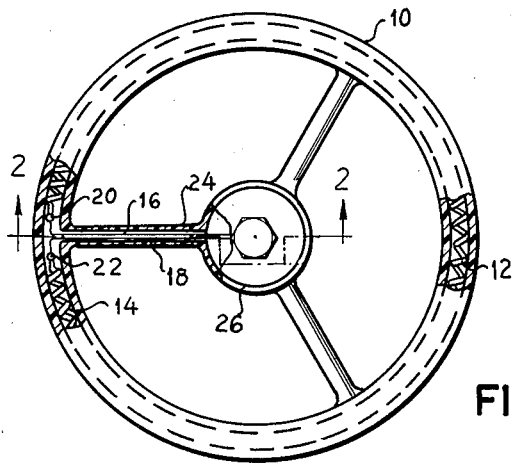
FIG. 1 is a plan view partially in section of a plastic steering wheel according to one embodiment of the invention, the plastic steering wheel having the heating element embedded therein.

In order to simplify the drawings, portions of the steering wheel and portions of the steering column not essential to the understanding of the invention have been omitted, it being understood that the invention is applicable to all types of steering wheels.

In the drawing which illustrates the best modes now contemplated by me for carrying out my invention, similar characters of reference indicate corresponding parts in all of the figures.

Figure 2:
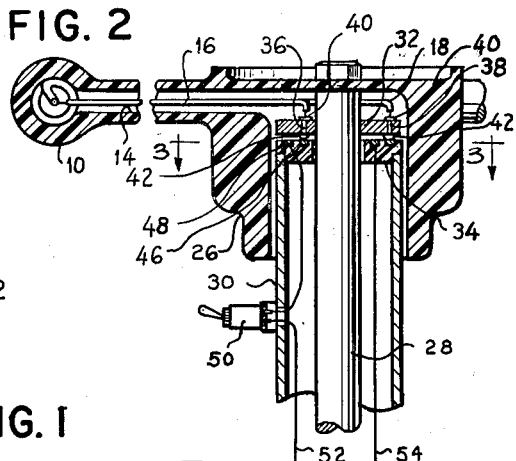
FIG. 2 is a sectional view taken on line 2—2 of FIG. 1, and illustrating the connection means for connecting the ends of the electrical heating element to the vehicle power source.
Figure 3:
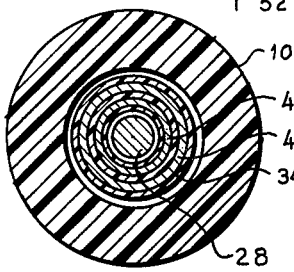
FIG. 3 is a sectional view taken on line 3—3 of FIG. 2.

In one embodiment of the invention as shown in FIGS. 1–3, a plastic steering wheel 10 is provided having an electrical heating element 12 embedded therein. The plastic steering wheel is provided with an internal channel 14 for receiving and completely enclosing the heating element 12. Connecting wires 16 and 18 each have one end connected with one of the ends 20, 22, respectively, of the heating element 12 and are completely enclosed within a spoke 24 connecting the steering wheel to the center portion 26 of the steering wheel; wires 16 and 18 are completely encased within the internal channel 14 and continue towards the steering shaft 28 and the steering shaft enclosure 30, exiting from the portion of internal channel 14 within spoke 18.

Steering wheel 10 is affixed to steering shaft 28 in a normal conventional manner. Also affixed to steering shaft 28 is a rotary disc 32 which cooperates with a stationary disc 34 fixedly connected with the steering shaft enclosure 30. Rotary disc 32 is provided with a pair of conductive bars 36 and 38 which are arranged to be connected with connecting wires 16 and 18, respectively; for this purpose, a shoe 40 is connected to each of connecting wires 16 and 18 for insuring positive connection with conductive bars 36 and 38, respectively.

The stationary disc 34 is provided with a pair of conductive rings 46, 48 adapted to be connected with conductive bars 36, 38, respectively by means of brushes 42. Brushes 42 may be spring biased in a conventional manner to insure contact between the conductive bars 36, 38 and conductive rings 46, 48, respectively.

As the steering wheel 10 rotates, the heating element 12 by means of connecting wires 16 and 18 may also be maintained electrically connected to the power source of the vehicle, i.e. the battery or the generator when this is effective to charge the battery. It will be seen that connecting wires 16 and 18 by virtue of their connection through stationary disc 34 which is fixedly connected with the steering shaft 28 and rotates with the steering wheel is effective to maintain electrical contact with conductive rings 46, 48 provided in the stationary disc 34.

In order to control the quantity of heat imparted by the heating element 12 to the steering wheel 10, a switch 50 is provided which may be of the toggle switch type or the rheostat switch type. Switch 50 is coupled to the steering shaft enclosure 30 and is connected in line or wire 52 which in turn is connected with conductive ring 48, and the other wire 54 is connected with conductive ring 46. In place of switch 50, a temperature control device may be connected in line 52 to maintain the heat of the steering wheel at a constant predetermined temperature. With the use of a switch 50, the control is left to the individual user.

It will be noted that in this embodiment of the invention all of the parts to heat the plastic steering wheel 10 with the exception of switch 50 are completely enclosed within the steering wheel 10 or the steering shaft enclosure 30. It will also be evident to those skilled in the art that it is not necessary for switch 50 to be connected to the steering shaft enclosure 30, but may be formed as one of the units of a motor vehicle panel board.

Figure 4:
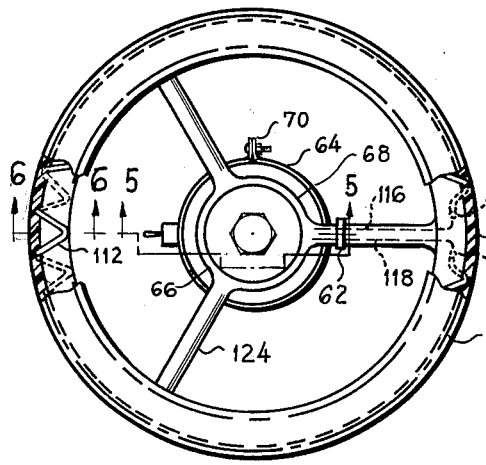
FIG. 4 is another embodiment of the invention illutrating a plastic steering wheel provided with a material covering thereon, the material covering having the electrical heating element enclosed therein.
Figure 5:
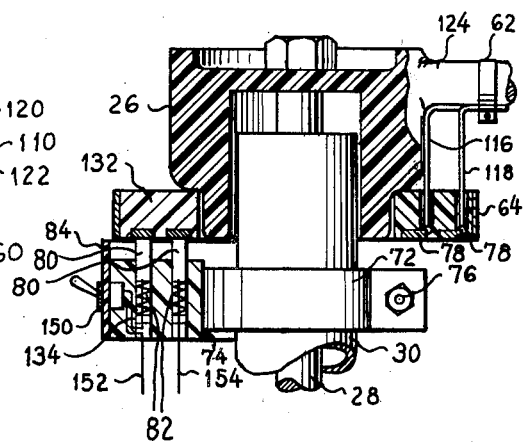
FIG. 5 is a sectional view taken along line 5—5 of FIG. 4.
Figure 6:
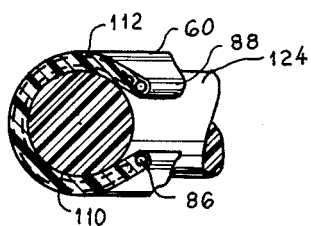
FIG. 6 is a sectional view taken along line 6—6 of FIG. 4.

A further embodiment of the invention is illustrated in FIGS. 4–6 where corresponding parts are designated by the same reference numerals as in FIGS. 1–3 with the addition of 100, and the same parts are designated with the same reference numerals.

In FIGS. 4–6, the applicability of the invention is shown in connection with a standard conventional plastic steering wheel 110. For this purpose, the present invention proposes the provision of a wheel covering 60 made from suitable heat transmitting material and enclosing a heating element 112. Connecting wires 116 and 118 are connected to ends 120 and 122, respectively, of the heating element 112 and extends along, preferably beneath, one of the spokes 124, and in order to maintain connecting wires 116 and 118 in the proper position on spoke 124 a spring connecting element such as a C-clamp 62 is provided.

As it is not possible to bring connecting wires 116 and 118 within steering shaft enclosure 30 and to place these wires in the interspace provided between steering shaft 28 and steering shaft enclosure 30, as best seen in FIG. 2, it is proposed to provide the stationary and rotary discs externally of the steering shaft enclosure. Referring now more particularly to FIG. 5 of the drawings, a rotary disc 132 is provided which is coupled to the center or hub portion 26 of the steering wheel 110 so that the rotary disc 132 will rotate therewith. In order to insure securement of the rotary disc 132, a clamping member 64 is provided which is hinged at 66 and 68 and secured together by means of nut and bolt 70 or any other suitable means. Hinges 66 and 68 are provided to facilitate the clamping of the rotary conductive disc 132 about the center or hub portion 26. Both the clamping member 64 and the rotary disc 132 are hinged at 66 and 68.

Associated with rotary disc 132 is a stationary member 134 which may be considered to be the equivalent of the stationary disc 34 as best seen in FIG. 2. Stationary disc 134 is fixedly connected with steering shaft enclosure 30 by means of a clamping device 72 of the conventional type. Clamp 72 generally comprises two side members which may be hinged at 74 to facilitate surrounding of the steering shaft enclosure, and the clamping device may be held together by any suitable means such as bolting device 76.

Rotary disc 132 is provided with a pair of spaced electrically conductive bars or members 78, each connected to connecting wires 116 and 118, respectively. The stationary conductive member which is fixedly coupled to the steering shaft enclosure 30 by means of clamping device 72 is juxtapositioned in operative relationship to rotary disc 132 so as to have brushes 80 maintained in engagement with the electrically conductive bars or members 78; for this purpose, the brushes 80 are received within channels provided in the stationary disc 134 and spring biased by means of springs 82 into electrical contacting engagement with the conductive bars or members 78. Electrically conductive wires 152 and 154 are provided to couple brushes 80 to the power source of the vehicle, i.e. the battery or the generator, with wire 152 being coupled to its corresponding brush 80 through the intermediation of a switch 150 which may be of the toggle or the rheostat type. Switch 150 is coupled to stationary disc 134 through an insulating enclosure 84 to insure that no contact is made with brushes 80 by the vehicle user. Should any sparking between brushes 80 and conductive bars or members 78 arise, such sparking will be maintained within the insulating enclosure 84.

Referring now more particularly to FIG. 6 of the drawings, wheel covering 60 is shown as being provided with a bead or wire member 86 together with an elastic enclosure 88 to ensure that the wheel covering 60 is maintained in position on the steering wheel 110. It will be evident that various types of wheel covering 60 together with stationary disc 134 and rotary disc 132 will have to be provided in accordance with the different types of steering mechanism dimensions provided.

With the invention as shown in FIGS. 1–3 or FIGS. 4–6, it will be evident that it is possible to provide effective means to keep the steering mechanism to a desired temperature whereby avoiding the personal discomfort to an operator of the vehicle as a result of the ambient temperature being too cold for comfort. The heating elements may be operated for such period of time to warm the steering wheel and provide comfort to the operator. Also, controls are provided where the operator may effectively vary the desired temperature of the steering wheel.

It is obvious that a great many minor variations in the details of design and of materials used in constructing steering wheel heating devices could be embodied in it without departing from the basic principle of the invention. Accordingly, all such deviations are claimed which fall fairly in the spirit and scope of the invention as identified in the hereinafter appended claims.

What I claim is:

1. A heating device for heating a vehicle steering wheel having a hub portion and a spoke portion connecting the steering wheel to the hub portion, a wheel covering for the steering wheel and a heating element in said wheel covering, means adapted to be connected in heat exchange relationship with said steering wheel for heating thereof, a rotary disc adapted for coupling to the hub portion externally thereof for rotation therewith, said rotary disc including first and second electrically conductive ring members, a stationary disc adapted for operatively coupling with the steering shaft enclosure and externally thereof, means electrically coupling said stationary disc to said rotary disc, said means including first and second spring-biased brushes received and retained within said stationary disc for electrical contacting relationship with said first and second ring members, respectively, means electrically coupling said rotary disc to said heating element including first and second connecting wires connected to said first and second ring members, respectively, and to said heating element for coupling the ends of said heating element with said first and second ring members, clamping means holding said first and second connecting wires to said spoke portion free of interference with said steering wheel as it rotates, and means including said rotary and said stationary discs for enclosing said brushes and said electrically conductive ring members.

2. A heating device according to claim 1 including further clamping means adapted for attaching said rotary disc with the central portion of the steering wheel and additional clamping means adapted for attaching said stationary disc to the steering shaft enclosure.

3. A heating device for heating a vehicle steering wheel having a hub portion comprising a wheel covering for the steering wheel, a heating element in said wheel covering, a rotary disc adapted for coupling to the hub portion for rotation therewith, a stationary disc adapted for coupling to the enclosure for the steering shaft and externally of said enclosure, means electrically coupling said stationary disc to said rotary disc, said means including first and second spring-biased brushes received and retained within said stationary disc for electrical contacting relationship with said first and second ring members, respectively, means electrically coupling said rotary disc to said heating element, said rotary disc including first and second spaced coplanar electrically conductive ring members, said second-mentioned means including first and second connecting wires connected to said first and second ring members, respectively, and to said heating element for coupling the ends of said heating element with said first and second ring members, an insulating enclosure coupled to said first-mentioned means enclosing said brushes and said ring members thereby preventing sparks from said brushes and said ring members reaching the vehicle steering wheel user, and to insure that no contact is made with said brushes or said ring members by the vehicle steering wheel user, a wire coupled to each said brush adapted for connection with an electrical power supply and switch means connected in one of said wires to regulate the heating effect of said heating element.

4. A heating device according to claim 3, including a bead in said wheel covering and an elastic portion forming part of said wheel covering enclosing said bead adapted to retain said wheel covering on the steering wheel, a first clamping member adapted for clamping said connecting wires to a spoke of the wheel, a second clamping member adapted for attaching said rotary disc with the center portion of the steering wheel, a third clamping member adapted for attaching said stationary disc to the steering shaft enclosure and an insulating enclosure enclosing the brushes and electrical portions between said rotary disc and said stationary disc.

5. A heating apparatus for heating a plastic steering wheel connected with a vehicle steering shaft enclosed within a steering shaft enclosure, comprising a steering wheel covering, an electrical heating element contained within said covering and having first and second wire ends, said wheel covering including elastic means and bead means in said elastic means for retaining said wheel covering in position on the steering wheel, first and second connecting wires each having one end electrically connected with said first and second wire ends, a first clamp adapted for retaining said connecting wires on a spoke of the steering wheel, a rotary disc, a second clamp adapted for clamping said rotary disc to the center portion of the steering wheel and externally of said center portion, said rotary disc including retained therein first and second electrically conductive bars electrically connected with the other ends of said first and second connecting wires, a stationary disc, a third clamp adapted for clamping said stationary disc to the steering shaft enclosure and externally thereof, said stationary disc having first and second recesses, a brush carried in each said recess, a spring in each said recess retaining said brushes and biassing said brushes into contact with said first and second electrically conductive bars, respectively, an insulating enclosure connected with said stationary disc adapted for enclosing said brushes and the portion of said bars in contact with said brushes, an electrical wire connected with each said brush adapted for connection to the vehicle power supply and switch means including a temperature control device connected in one of said last-mentioned wires for controlling the heating effect of said electrical heating element.

References Cited in the file of this patent
UNITED STATES PATENTS

| | | |
|---|---|---|
| 1,062,745 | Smith | May 27, 1913 |
| 1,241,782 | Tharp | Oct. 2, 1917 |
| 1,581,884 | Steuart et al. | Apr. 20, 1926 |
| 1,769,517 | Ivandick | July 1, 1930 |
| 2,392,539 | Leible | Jan. 8, 1946 |
| 2,530,559 | Wilson | Nov. 21, 1950 |
| 2,652,476 | Di Langiano | Sept. 15, 1953 |
| 2,835,777 | Gates et al. | May 20, 1958 |

FOREIGN PATENTS

| | | |
|---|---|---|
| 447,619 | Great Britain | May 22, 1936 |